(12) United States Patent
Christensen

(10) Patent No.: US 9,890,898 B2
(45) Date of Patent: Feb. 13, 2018

(54) ADJUSTABLE ROD

(71) Applicants: 9. Solutions Technology Co., Limited, Hong Kong (CN); Bo Christensen, Nordborg (DK)

(72) Inventor: Bo Christensen, Nordborg (DK)

(73) Assignees: 9. Solutions Technology Co., Ltd., Hong Kong (HK); Bo Christensen, Nordborg (DK)

( * ) Notice: Subject to any disclaimer, the term of this patent is extended or adjusted under 35 U.S.C. 154(b) by 0 days.

(21) Appl. No.: 15/492,551

(22) Filed: Apr. 20, 2017

(65) Prior Publication Data
US 2017/0219160 A1 Aug. 3, 2017

Related U.S. Application Data

(63) Continuation-in-part of application No. 14/847,924, filed on Sep. 8, 2015.

(51) Int. Cl.
*F16M 11/26* (2006.01)
*F16B 7/14* (2006.01)

(52) U.S. Cl.
CPC ............. *F16M 11/26* (2013.01); *F16B 7/14* (2013.01); *F16M 2200/027* (2013.01)

(58) Field of Classification Search
CPC ........... F16M 11/26; F16M 11/32; F16B 7/14; F16B 7/1418; F16B 7/1454; F16B 7/149; F16B 2007/16; F16B 2/246; F16B 2/245

USPC .................................. 248/410, 414; 292/306
See application file for complete search history.

(56) References Cited

U.S. PATENT DOCUMENTS

| | | | | |
|---|---|---|---|---|
| 1,447,519 A | * | 3/1923 | Schade ................. | F16L 32/246 269/170 |
| 4,191,438 A | * | 3/1980 | Day ......................... | A47F 5/13 248/412 |
| 5,595,410 A | * | 1/1997 | Wilson .................. | E05C 19/008 292/259 R |

* cited by examiner

*Primary Examiner* — Christopher Garft
(74) *Attorney, Agent, or Firm* — Wang Law Firm, Inc.

(57) ABSTRACT

A telescopic rod contains a first element, and a second element, and a locking mechanism. The first element is in the form of a hollow tube with an interior wall. The second element is arranged slidingly along a longitudinal axis within the first element. The locking mechanism is coupled with the second element to lock the relative position of the second element with regard to the first element. The locking mechanism includes a clamp washer to be moved between a locking position and an unlocked position it is located in an angular position axis. An angle of the clamp wash in the unlocked position with regard to the longitudinal is smaller than that in the locking position. An edge of the clamp washer meshes with the interior wall in the locking position, so that a frictional connection is formed between the edge and the interior wall.

2 Claims, 13 Drawing Sheets

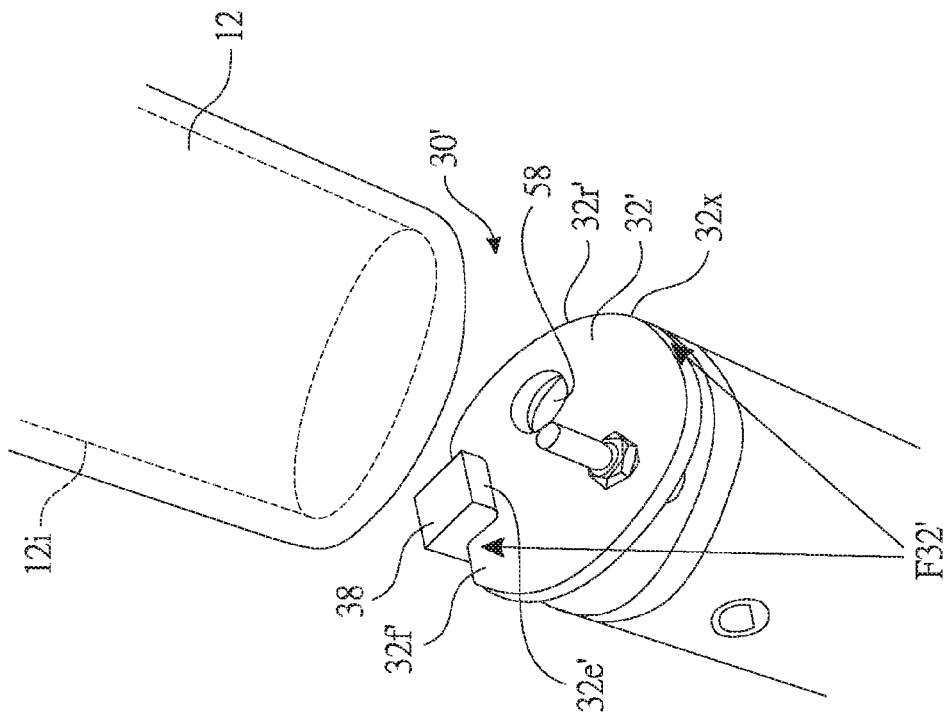
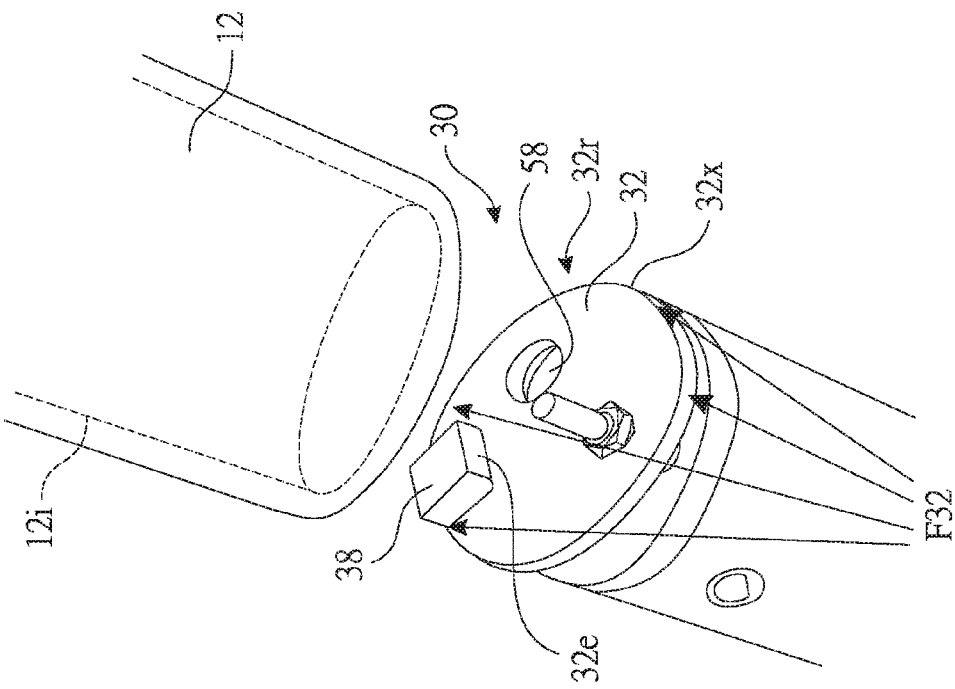

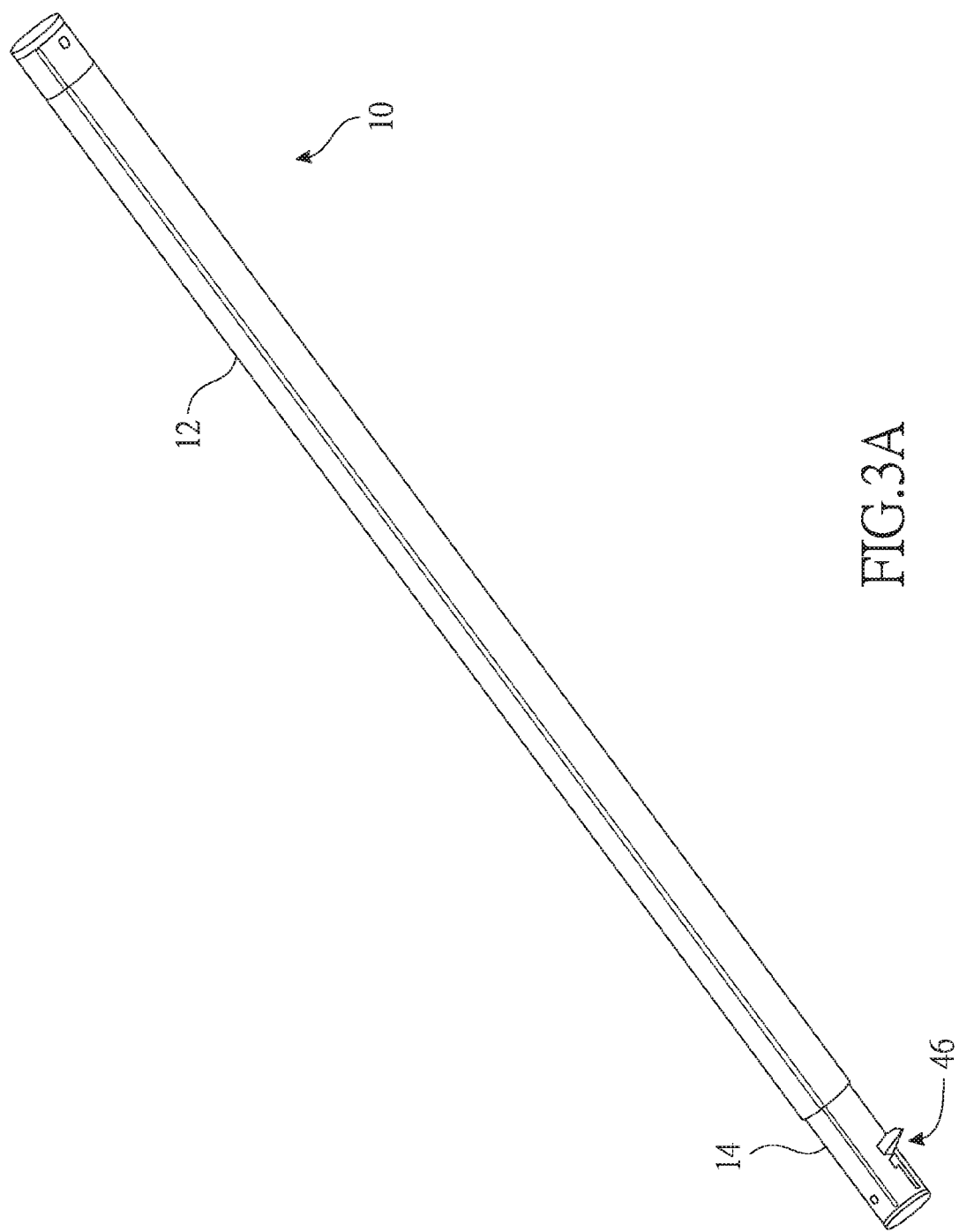

ADJUSTABLE ROD

CROSS REFERENCE TO RELATED APPLICATION

This application is a continuation-in-part of U.S. patent application Ser. No. 14/847,924, filed on Sep. 8, 2015, the entire specification of which is incorporated herein by reference.

BACKGROUND

Field of the Invention

The present invention relates to an adjustable rod and the use of the adjustable rod in a stand.

Related Prior Art

Stands are used for the stable setup of cameras, lamps or other devices. A conventional example of a stand is the so-called tripod. Stands typically have different adjustment levels, such as swivel direction, tilting and/or height. A variation of the height can be realized, for example, by using telescopic legs, the length of which is variable.

The principle of such telescopic tubes or telescopic rods consists in that a first element is in the form of a hollow tube, while a second element (e.g. a round rod) can be inserted into this first element. Depending on the different position of the two rods relative to each other, a different total length of the two rods will result. To prevent the accidental movement of the two elements with regard to each other, the two tubes are locked with a locking mechanism.

Examples for such locking mechanisms, which also allow a progressive locking, are the so-called clamping jaw threads in combination with a union nut. In this case the clamping job thread is attached to one end of the hollow tube, so that the second tube is moved slidingly along the longitudinal axis through the clamping jaws, similarly to a friction bearing. By tightening the union nut, the clamping jaws are deformed in such a way that the contact area with the second element is reduced so that a normal force is applied onto the second element. Thus, a frictional connection is formed, which leads to a locking of the two telescopic elements. It should be noted here, that the locking mechanism is thus formed to support longitudinal forces on the one hand, while on the other hand also absorbing bending moments. However, a disadvantage of this case is that the union nut must be loosened again after each adjustment, so that a one-hand operation is nearly impossible. Further disadvantages consist in the fact that, especially for telescopic bars with more than two elements, the adjustment can only be carried out at the respective end of one bar, which further reduces the ease of use for very long telescopic bars. Therefore, an improved approach is needed.

SUMMARY

It is the object of the present invention to provide a telescopic bar, which enables a progressive adjustment and is marked by ease of use in the form a quick operation and/or even a one-hand operation.

The object is achieved by the independent claims.

A telescopic rod of the embodiments of the present invention provides comprises a first element, a second element and a locking mechanism. The first element is implemented in the form of a hollow tube with a (round or flattened) interior wall. The second element is slidingly arranged (or mounted) along the longitudinal axis of the first element inside the first element, where a length of the telescopic rod depends on a relative position along the longitudinal axis. The purpose of the locking mechanism is to lock the relative position of the second element with regard to the first element, and for this purpose it is connected with the first element (e.g. by screwing on or by hooking in). The locking mechanism comprises a (round or flattened) clamp washer, which in a locking position is angled with regard to the longitudinal axis with a first angle range, the angle being smaller than 90°, but larger than 45° (e.g. angles between 89° and 75°, or between 85° and 60°), and which in an unlocked position is also angled with regard to the longitudinal axis with a second angle range, where the angle is smaller than the first angle range. In the locking position, an edge of the clamp washer (i.e. a round or flattened area) meshes with the interior wall (or an area of the interior wall) in such a way that a frictional connection is formed between the edge and the interior wall. The frictional connection can be realized in any relative position of the two elements to each other, so that a progressive adjustment of the telescopic rod is possible. Since the locking position only differs from the unlocked position by a different angle with regard to the longitudinal axis, it is possible to change quickly between the unlocked position and the locking position, which is a prerequisite for a quick adjustment.

This means that the embodiments of the present invention are based on the fact that the positions of two parts of a telescopic rod, namely a hollow tube and a tube that can be inserted into the hollow tube, can be fixed relatively to each other with a locking mechanism, which is disposed in the hollow tube. For this purpose, the locking mechanism is connected directly with the element to be inserted, e.g. by screwing on, or integrated into this element. The locking mechanism comprises a so-called clamp washer, which is pivotally mounted on an axis that is orthogonal to the longitudinal axis of the telescopic rod. Depending on the angular position (angle included between the longitudinal axis and the clamp washer), two positions can be formed, namely a locking position and an unlocked position. The unlocked position includes an included angle with the longitudinal axis, while the locking position of the longitudinal axis includes a wedged angle, which is greater than the included angle. As a result of this wedged angle, the clamp washer "becomes wedged" within the hollow tube, or, to be precise, it meshes with an interior wall of the hollow tube. Due to this meshing, a normal force is applied by the clamp washer onto the interior wall, so that a frictionally engaged connection can be formed between the locking mechanism (attached to the second element) and the hollow space (the first element).

According to the preferred embodiment, the wedged angle is smaller than 90° in the locking position, thus slightly (e.g. 89°) inclined towards a first direction along the longitudinal axis. This has the advantage that a force along the longitudinal axis, which is counter to the first direction, can better be absorbed due to the wedging.

According to further preferred embodiments, the locking mechanism comprises a spring, which presses the clamp washer from the unlocked position into the locking position, while simultaneously applying a force in the direction of the longitudinal axis so that the normal force between the clamp washer, or the edge of the clamp washer, and the interior wall of the hollow tube is created or increased. According to further embodiments, the clamp washer may comprise a lever wherein, by operating the same, the clamp washer is moved from the locking position to the unlocked position. This lever may protrude, e.g. through a slot, which extends along the longitudinal axis through the first element, so that the operation is possible from the outside, or it may be part of a remote operation mechanism, which allows the movement or the angular movement of the clamp washer, e.g. through a push rod arranged along the longitudinal axis.

According to an embodiment, the clamp washer can be a flattened washer, so that the clamp washer only comes into contact with the interior wall in a locally limited circular segment, which has an advantage that a large force can be generated on an area (normal force per area). In addition, there's also another advantage that an accidental wedging, e.g. during unlocking, is prevented if the intervention area is locally limited. According to further embodiments, it would also be feasible that the clamp washer isn't necessarily round, or at least not round in the intervention area, but flattened.

According to further embodiments, the locking mechanism may also has two clamp washers, one of which is inclined towards the first longitudinal direction, while the other of which is inclined towards the second longitudinal direction. This offers the advantage that the telescopic rod is flexible both to a tension and a compression force.

According to further embodiments, the telescopic rod is part of a tripod leg, comprising, for example, three telescopic rods. Therefore, a further embodiment relates to a tripod leg with a telescopic rod according to the above features.

The preferred embodiments of the present invention are described below based on the attached drawings, wherein:

BRIEF DESCRIPTION OF THE DRAWINGS

FIGS. 2A-2B are perspective views of the locking mechanisms with clamp washers of different shapes of further preferred embodiments of the present invention;

FIGS. 3A-3E are perspective view of the telescopic rod with the locking mechanism, which comprises the round or oval clamp washer and can be operated by means of the remote operation mechanism, of a further preferred embodiment of the present invention, in which FIG. 3C is an enlarged view of the upper circle of FIG. 3B, and FIG. 3D is an enlarged view of the lower circle of FIG. 3B;

DETAILED DESCRIPTION

Figure 1:
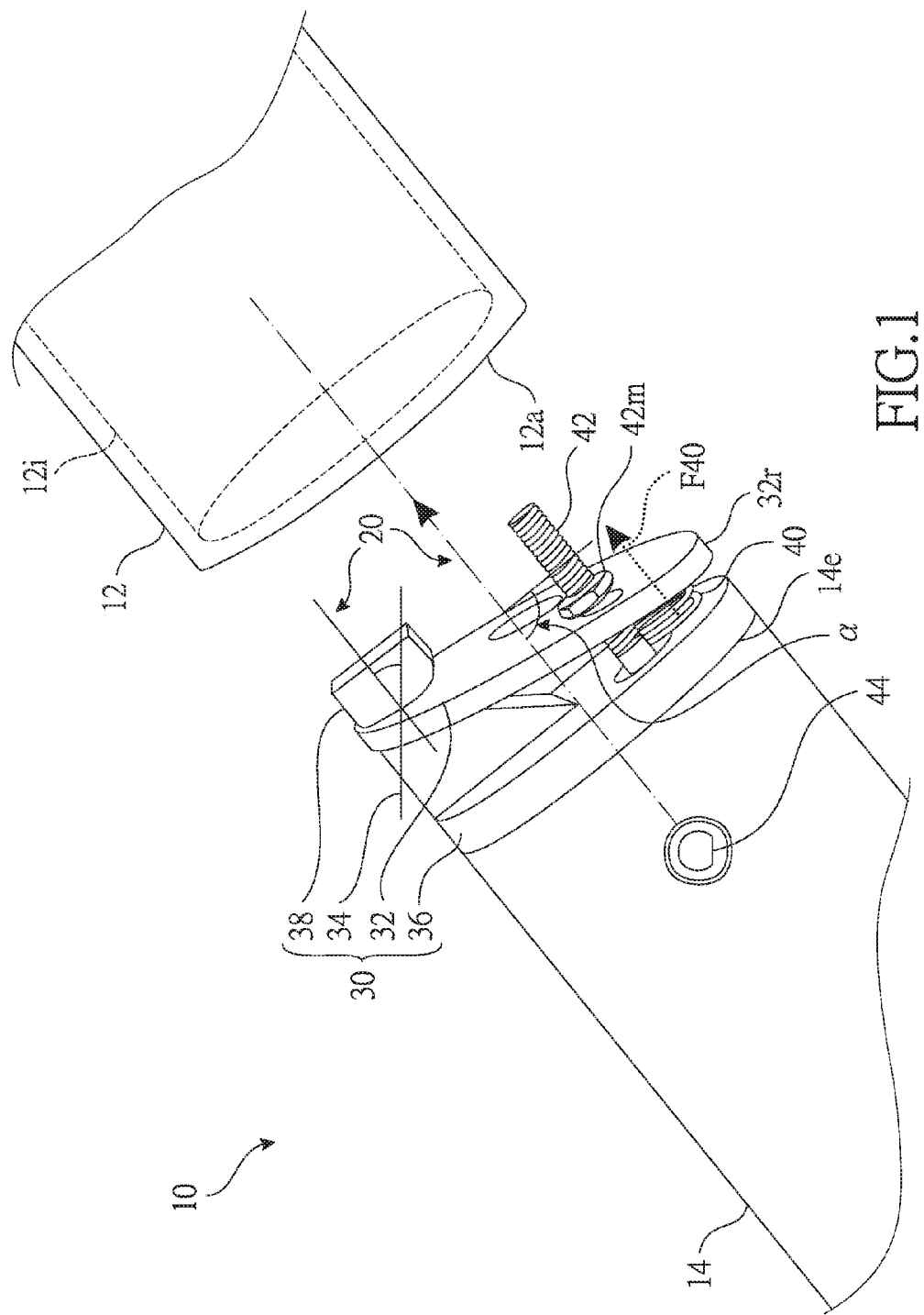
FIG. 1 is a perspective view of a locking mechanism for locking two telescopic elements of the telescopic rod of a first preferred embodiment of the present invention.

Before explaining the preferred embodiments of the present invention in detail below, it should be noted that the same elements and structures are marked with the same reference numerals so that the description is applicable to all of them or is interchangeable.

FIG. 1 shows a telescopic rod 10 of the first preferred embodiment of the present invention, having a first element 12 and a second element 14. The second element 14 of the telescopic rod 10 is shown separately from the first element 12.

The first element 12 has a form of a (round, elongated) hollow tube. Due to the shape of the hollow tube, the first element 12 has an aperture 12A, and an interior wall 12i formed inside of the hollow tube 12. In this preferred embodiment, the second element 14 is also a cylindrical (elongated) member, an outer diameter of which is smaller than an inner diameter of the hollow tube 12, so that the second element can be inserted into the hollow tube 12 (referring to arrow 20). The arrow 20 also is identical to a longitudinal axis of the telescopic rod 10. By telescoping the cylindrical element 14 into the hollow tube 12, the length of the telescopic rod 10 becomes variable. This means in other words that the relative position of the two elements 12 and 14 along the longitudinal axis 20 defines the length of the telescopic rod 10. In order to lock the relative position of the two elements 12 and 14 with regard to each other, the telescopic rod 10 contains a locking mechanism 30, which is described below.

In this preferred embodiment, the locking mechanism 30 is fixedly connected to the second element 14. Here, the connection is made at an end 14e of the second element 14, which is to be inserted into the first element 12 so that the locking (between the elements 12 and 14) can take place inside the hollow tube 12. The locking mechanism 30 comprises at least one clamp washer 32, which is mounted around a rotation axis 34. The rotation axis 34 is defined by an intervention area 32e of the clamp washer 32 and a fixed area 36 for attaching the locking mechanism 30 on the second element 14. In this preferred embodiment, the fixed area 36 comprises a projection 38, with which the intervention area 32e is meshed. The rotation axis 34 is perpendicular to the longitudinal axis 20. Preferably but not necessarily the rotation axis 34 is in a decentralized manner with regard to the second element 14, thus also with regard to the first element 12. Due to a rotary mounting of the clamp washer 32 around the rotation axis 34, the angles can be adjusted in a corresponding different angle ranges between the rotary element 32 and the longitudinal axis 20 (referring to angle α).

In a first angle range, the angle α is smaller than 90°, but larger than 45°, preferably between 60° and 75°. This angle range forms a locking position. A second angle range is smaller than the first angle range. This second angle range, which is also called the angle range of an unlocked position, depends on the size of the clamp washer 32. The background to this is that the clamp washer 32, which in this embodiment is a round washer, is preferably slightly larger than the inner diameter of the hollow tube 12, and thus also slightly larger than the second element 14, or at least protrudes beyond the outer diameter of the tube 14, so that in the locking position there is a clamping of the locking mechanism 30 or of the clamp washer 32 with the interior wall 12i of the hollow tube 12. In this case, an edge 32r of the clamp washer 32 is meshed with the interior wall 12i of the hollow tube 12. As already explained above, the meshing takes place at a low angle, e.g. at about 90°, such as 85° or 80°, while with high acute angles the two elements can be telescoped freely with regard to each other (unlocked position). This means that the locking mechanism 30 enables the fixing of a relative position of the two elements 12 and 14 to each other by applying a normal force onto the interior wall 12i through the clamp washer 32 and its clamping edge 32r, as a result of which a friction force is generated along the longitudinal axis 20. This means that both tension and compression forces along the longitudinal axis 20 can be absorbed. Given that in the locking position an angle α is inclined in a direction towards the longitudinal axis 20, the telescopic rod 10 can resist a tension force (referring to the arrow 20) better than a compression force.

According to further preferred embodiments, the locking mechanism 30 can comprise a spring 40, which is located between the fixed area 36 (for the attachment of the locking mechanism 30 on the second element 14) and the clamp washer 32, and is intended to apply a spring force F40 onto the clamp washer 32, thus moving the clamp washer 32 to the direction of the locking position, or holding it there.

According to further preferred embodiments, the locking mechanism 30 comprises a push rod 42, with which the clamp washer 32 can be moved back and forth between the locking and the unlocking position, so that a remote operation mechanism is formed. As shown in this embodiment, this push rod 42 is formed of a threaded rod, which is meshed with the clamp washer 32 by means of a nut 42m. In the embodiment, the clamp washer 32 can advantageously be moved in combination with the spring 40 by means of the remote operation mechanisms 42 from the locking position to the unlocked position (against the spring force F40), while the spring 40 moves the clamp washer 32 back from the unlocked position to the locking position. It should be noted here that both the spring 40 and the push rod 42 are preferably arranged at a certain distance from the rotation axis 34, so that a lever arm with sufficient length (0.5 or 0.3 of the diameter of the clamp washer 32) is formed, as a result of which torques with which the clamp washer 32 is pressed against the interior wall 12i are large enough.

As for the connection between the second element 14 and the locking mechanism 30, there are various options. Thus, for example, the second element 14 can also be a hollow tube, where the locking mechanism 30 is inserted at the end 14e like a cap. According to the preferred embodiments, a cross bolt 44 or a cross screw joint 44 can be provided to secure the cap. According to alternative preferred embodiments, the hollow tube 14 could be provided with an internal thread, so that the complete locking mechanism 30 could be screwed in.

FIG. 2 shows different variants for the locking mechanism or, more particularly, different variants for the lock washer.

FIG. 2A shows the basic preferred embodiment according to FIG. 1, in which the clamp washer 32 is round, and the round edge 32r is only interrupted by the intervention area 32e, which serves for the intervention with the protrusion 38. As a result of this, the clamp washer 32 is meshed with the interior wall 12i of the first element 12 in several positions (referring to marking F32) in the locking position. For a better illustration of the intervention area, the edge is additionally marked with the reference numeral 32x in the position where a maximum normal force is applied to the interior wall 12i.

As shown in FIG. 2B, this system can be improved. FIG. 2B shows a locking mechanism 30', which corresponds to the locking mechanism 30, with the exception of the clamp washer. Here the clamp washer 32' is additionally flattened on the side of the intervention area 32e' for the intervention with the protrusion 38 (referring to reference numeral 32f'). As a result of this, the force for locking, especially between the intervention area 32e' and the intervention area 32x' (opposite from the intervention area 32e'), is absorbed—shown by the arrows F32'. Therefore, a higher force is applied to the interior wall 12i of the first element 12 by the intervention area 32e', which is advantageous from the point of view of the frictional connection. In addition, possible problems during the adjustment, resulting from undefined clamps, can be avoided by the clamp washer 32.

With reference to FIG. 3A-E, the optional remote operation mechanism already mentioned in FIG. 1 is described in detail.

Figure 3B:
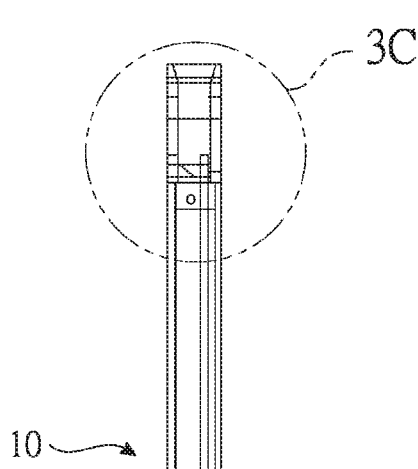

FIG. 3A shows a telescopic rod 10 with a first element (hollow tube) 12 and a second element 14, which is inserted into the hollow tube 12. In addition, it is obvious from FIG. 3A that a remote operation mechanism is provided here, which extends in the interior of the second element 14 (here again in the form of a hollow tube), while only a lever 46 protrudes from the second element 14. The exact arrangement of the remote operation mechanism is obvious especially from FIGS. 3B-3E.

Figure 3C:
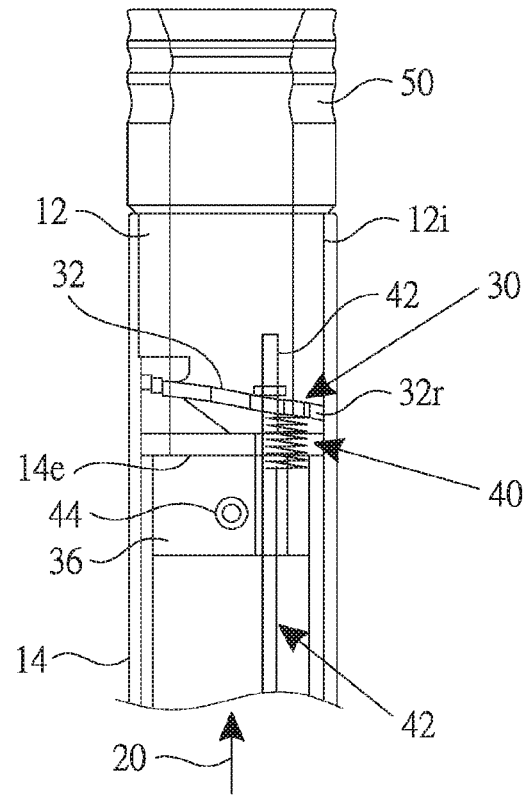
Figure 3D:
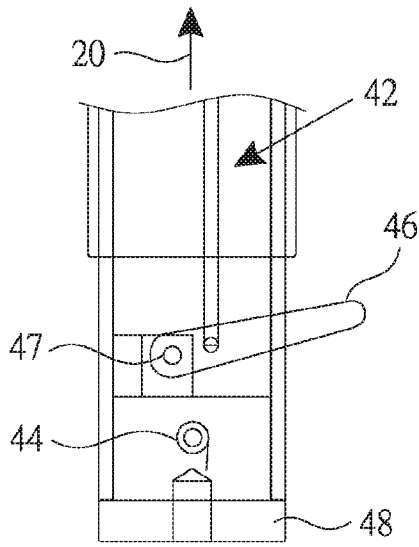
Figure 3E:
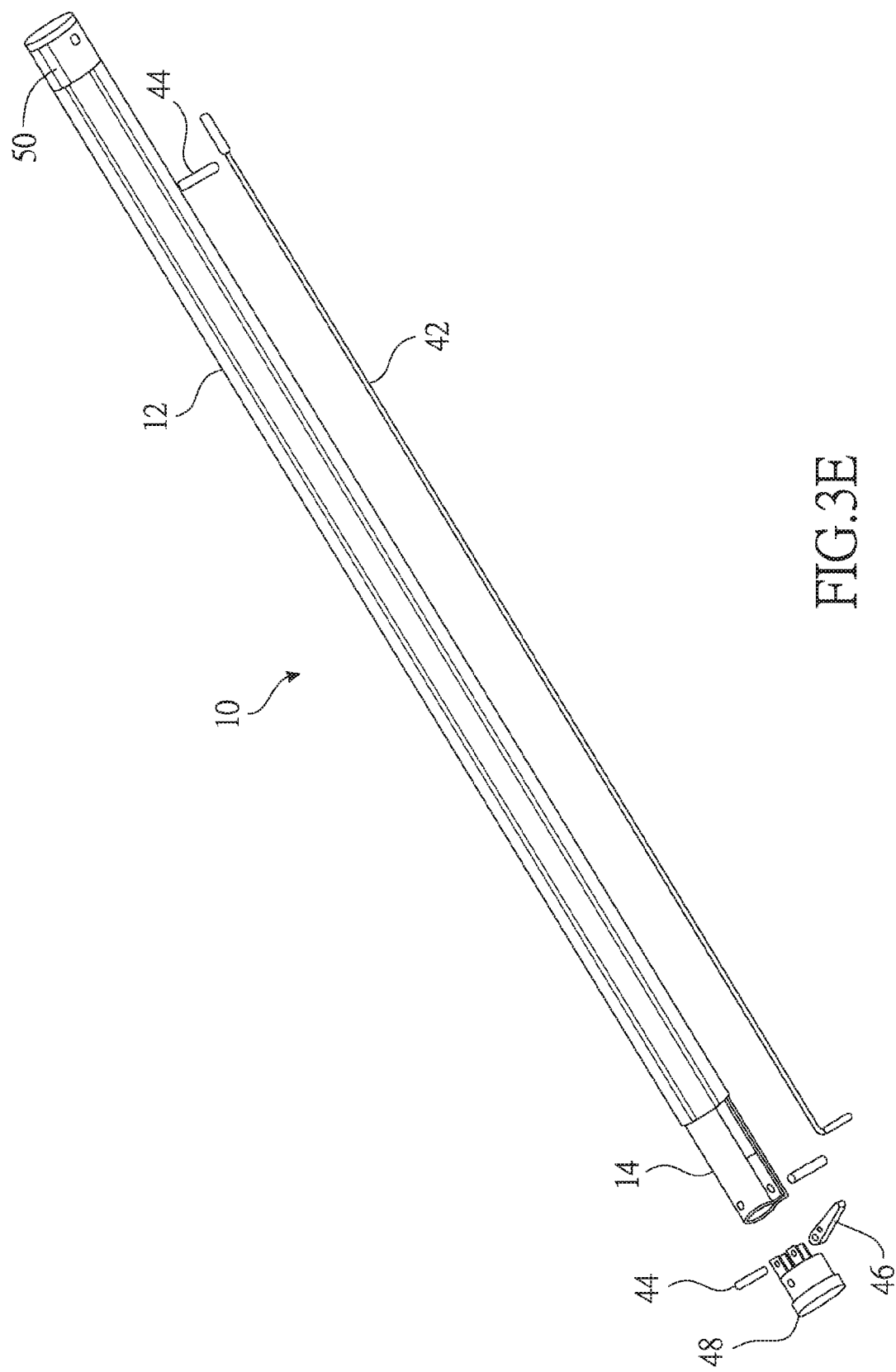

FIG. 3B shows the telescopic tube 10 in a cross-sectional view, where two areas in which the locking mechanism 30 and the release lever 46 are located are shown enlarged. The structure of the locking mechanism 30 corresponds to the one explained in FIG. 1, while the locking mechanism 30 here comprises the optional spring 40 and the optional operation push rod 42. It should be noted that the blown-up illustrations, FIGS. 3C and 3D, show how the clamp washer 32 with its edge 32r meshes with the interior wall 12i of the first element 12 in the locking position.

Analogously to the preferred embodiment of FIG. 1, the locking mechanism 30 is attached to one end 14e of the second element 14 by means of a plug 36, while the operation handle 46 is attached to the opposite end of element 14. The operation push rod 42, which extends through the complete element, is coupled with the release lever 46, which in turn is mounted pivotally on a kind of end plug 48 of the second element 14. In detail, the release lever 46 is mounted on an eccentric rotation axis 47, which also runs orthogonally to the longitudinal axis 20, while the plug 42 is meshed with the release lever 46 in such a way that a lever arm is generated between the intervention area of plug 42 and the pivot point 47. This means that when operating the lever 46, the operation push rod 42 can be moved along the longitudinal axis 20, which in turn enables the clamp washer 32 to be moved back and forth between the release position and the locking position.

This preferred embodiment has the remote operation mechanism, comprises at least a plug rod 42 and the lever 46, formed in such a way that when the release lever 46 is moved in a direction, e.g. clockwise around its rotation axis 47, the clamp washer 32 is moved in the same direction, or similarly moved clockwise. This also makes it possible that the clamp washer 32 is moved from the locking position to the unlocked position when the lever 46 is moved downwards (=clockwise).

Optionally, the fixed element 48 for supporting the lever 46, and the fixed area 36 for attaching the locking mechanism 30 to the second element 14, are both in the form of an end plug, while each end plug 36 and 46 is attached by means of a bolt 44 (referring to FIG. 1).

As is obvious especially from FIGS. 3B-3D, the end plug 48 is a flange and comprises a central thread for the flanging of additional elements, e.g. a tripod joint. The opposite element of the telescopic rod 10, here with the reference numeral 50, forms a foot in this preferred embodiment, so that the telescopic rod 10 can be inserted, for example, into a stand or a tripod leg.

Referring to FIGS. 4A-E, an expanded preferred embodiment is explained, where the inserted clamp washer and the elongated elements of the telescopic tube have a different shape.

Figure 4A:
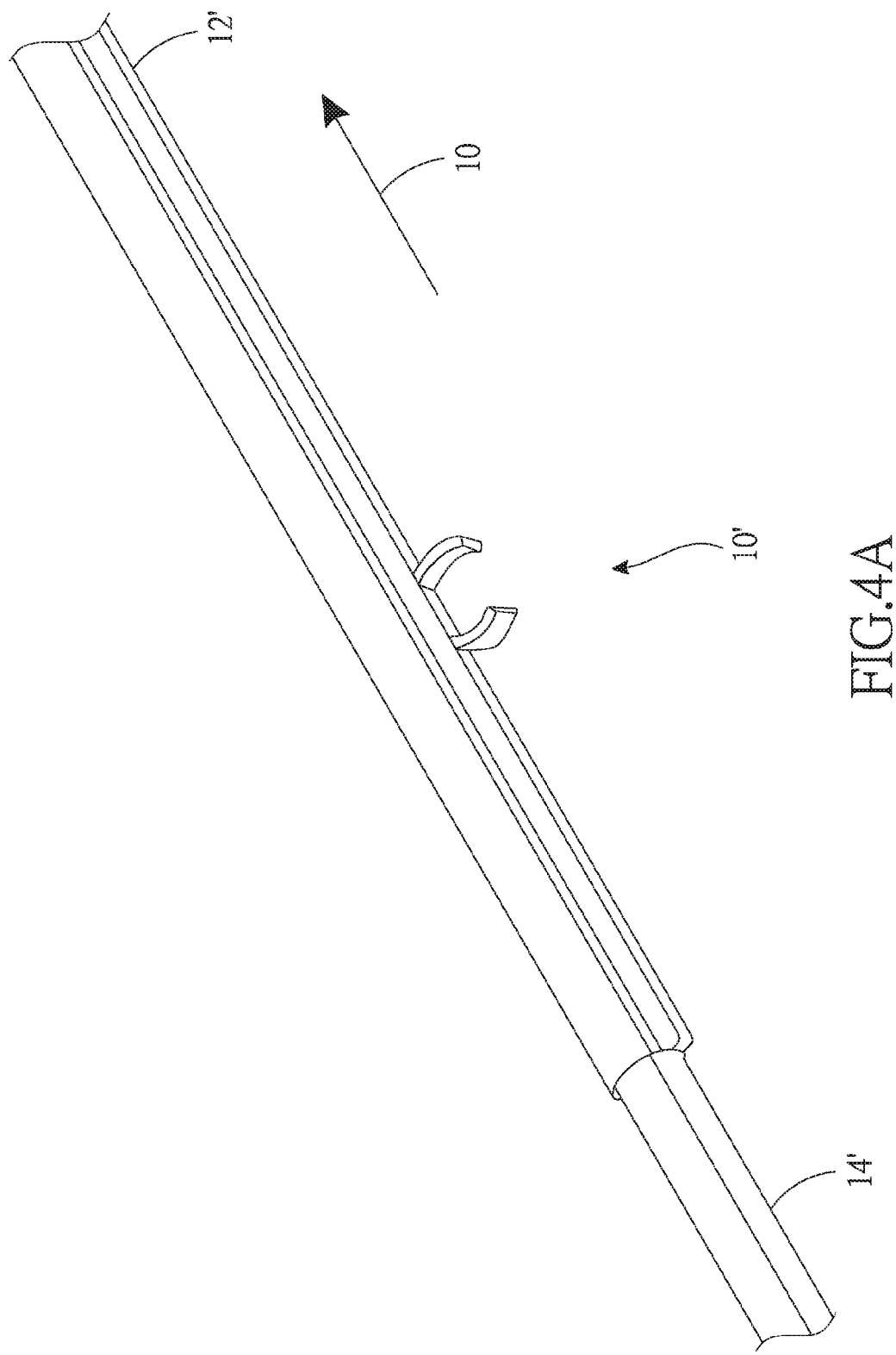
FIG. 4A-4E are schematic diagrams of the telescopic rod with the locking mechanism, which comprises the flattened clamp washer and can be operated by means of the lever.
Figure 4B:
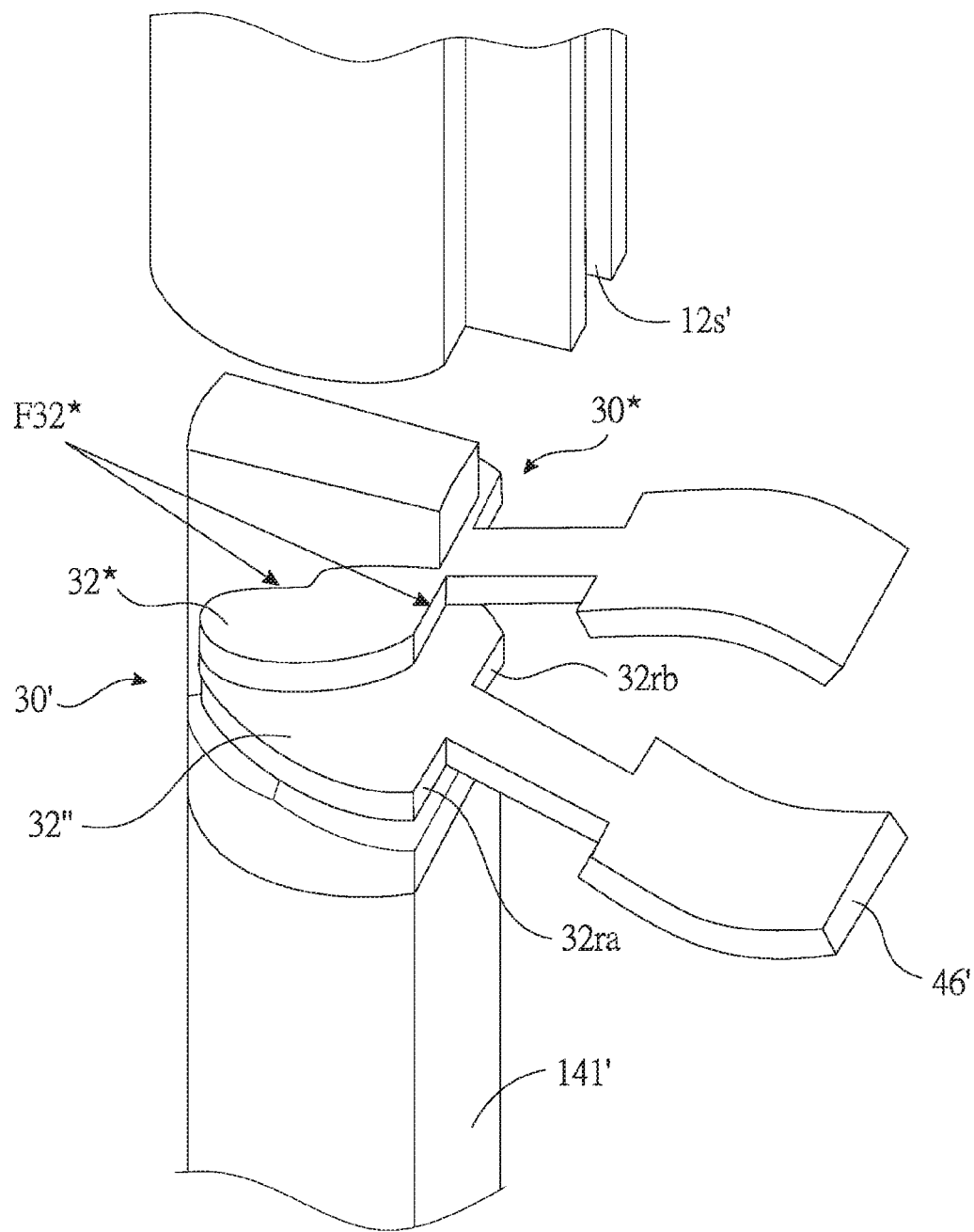
Figure 4C:
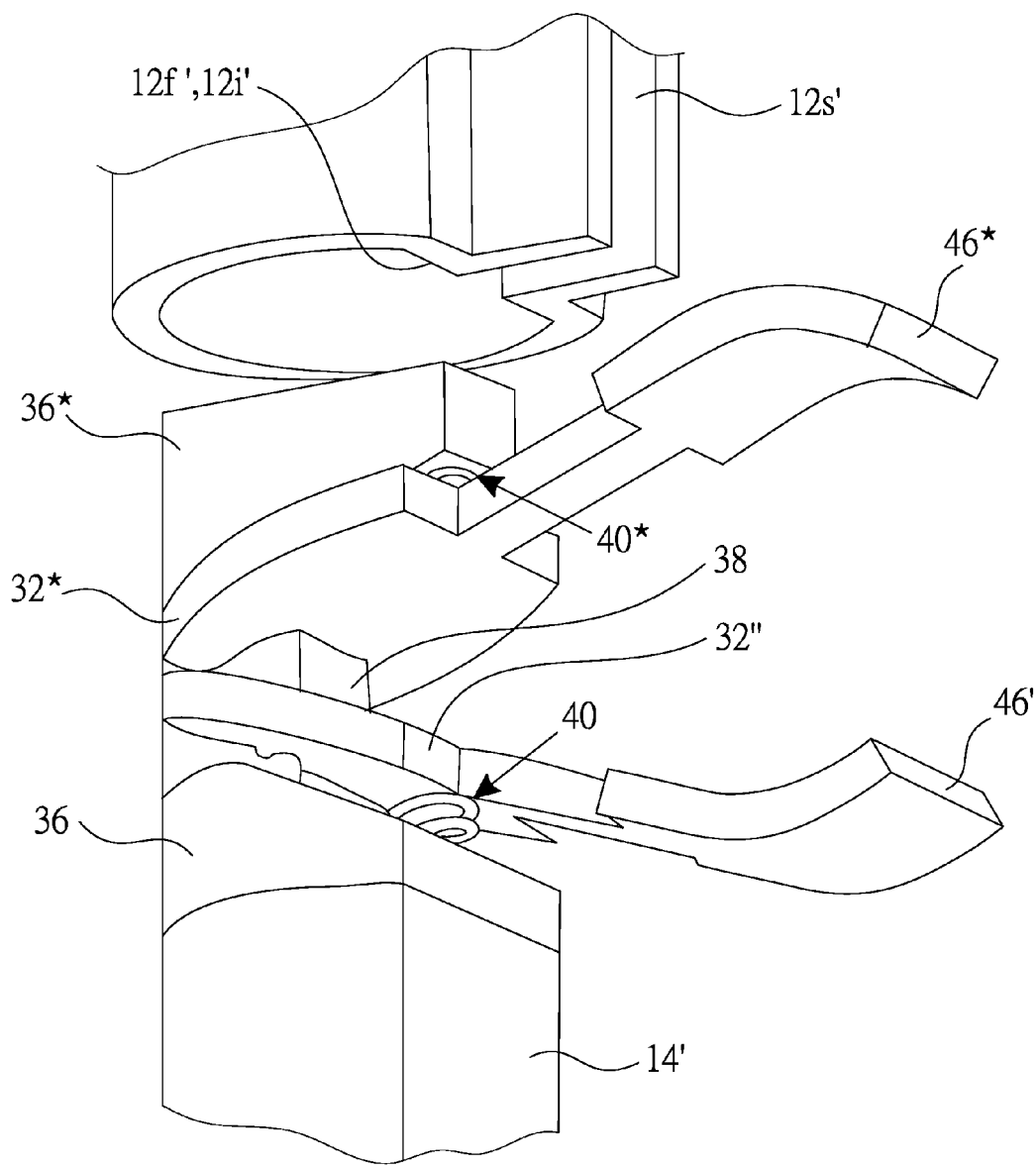

FIG. 4A shows a telescopic rod 10', where the first element 12' has a slot 12s' along the longitudinal axis 20, while the clamp washer 32" is here implemented in such a way that a lever 46' is formed by it, which lever protrudes through the slot 12s'. This means that the operation of the locking mechanism 30' is possible from the outside, even without a remote operation mechanism.

According to further embodiment examples, the clamp washer 32" can comprise a flattened area, here marked with the reference numerals 32ra and 32rb. This divided, flattened area 32ra and 32rb forms the edge 32ra and 32rb, through which the meshing with the first element 12' is to take place (referring to force application points of the normal force F32*).

Due to this flattened area 32ra and 32rb, the cross-sections of the first element 12' and, thus, also the second element 14' is also adjusted. This cross-section becomes especially clear in FIG. 4C, which shows that the cross-section comprises a rotary circular segment, e.g. 315°, with a flattened area 12f. This flattened area 12f also forms the interior wall 12i' for meshing with the clamp washer 32" or the edge area 32ra and 32rb. In this preferred embodiment, the slot 12s' is located in the center of the flattened area 12f. Regarding the additional features, such as the spring 40 or the fixed area 36 for the attachment of the locking mechanism 30' to the second element 14', the preferred embodiment here corresponds to the preferred embodiment described with reference to FIG. 1 and FIG. 2. And the functioning is also the same.

Figure 4D:
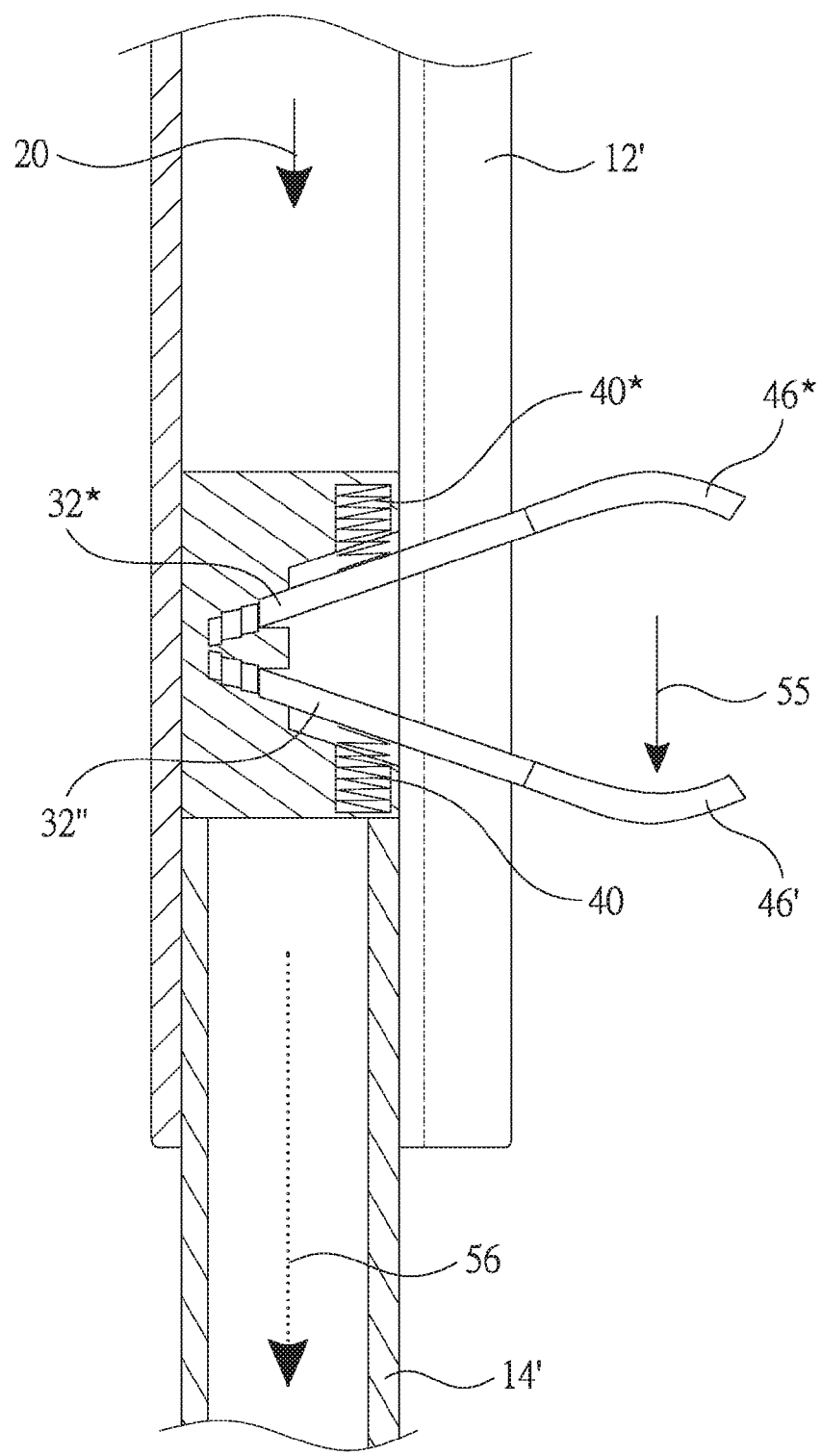
Figure 4E:
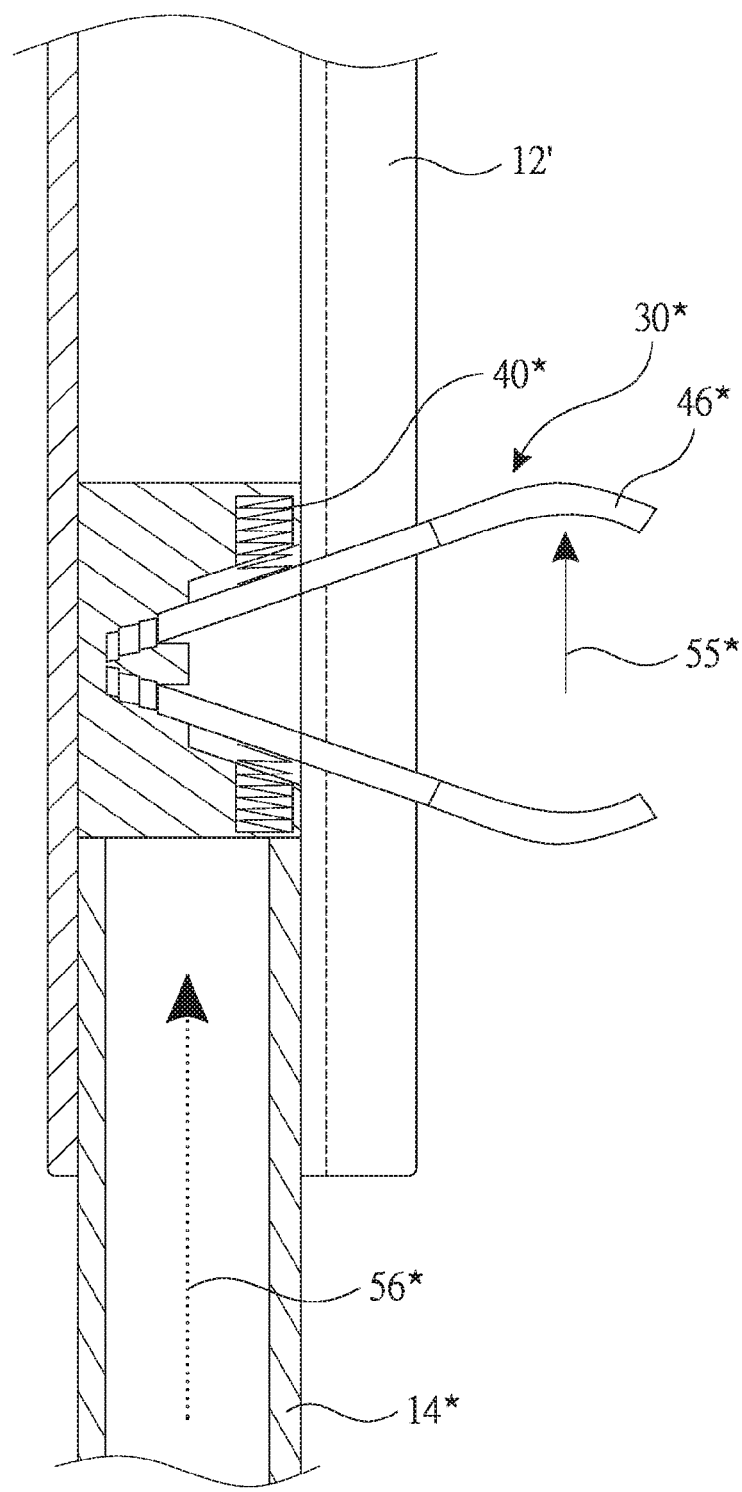

Thus, as shown in FIGS. 4D and 4E, the operation lever 46' is moved against the spring force of spring 40 from the locking position to the unlocked position (force applied along the longitudinal axis 20; referring to the arrow with the reference numeral 55). Therefore, a longitudinal force is simultaneously applied to the second element 14', so that the telescopic rod 10' is extended at the same time (referring to the arrow with the reference numeral 56). As explained above, the locking force of the clamp washer 32" is larger against direction 56 than in direction 56, due to the angular arrangement.

According to further preferred embodiments, the angle can be higher in the locking position, e.g. 45°, so that a locking force is generated almost only against the direction 56. For such preferred embodiments it is advantageous if a second locking mechanism 30* with a second clamp washer 32* and counter-orientation is provisioned. This second locking mechanism 30* corresponds in principle to the locking mechanism 32" and also comprises a clamp washer 32*, a spring 40*, and an operation lever 46*, and it is attached through the fixed area 36*, which represents an extension of the fixed area 36. In other words, the fixed areas 36 and 36* form an extension of the second element 14', where a V-shaped groove is provided perpendicularly to the direction of longitudinal axis 20, in order to receive the two clamp washer 32" and 32*, which are mounted in a mirrored position. At the tapered end of the V-shaped groove, the common protrusion 38 is located, which forms the rotation axes for the two clamp washers 32" and 32*.

This second locking mechanism 30* enables the locking in direction 56, but also counter to direction 56*. When retracting the telescopic rod 10' in the direction 56*, the second operation lever 46* is pressed in order to move the second locking mechanism 30* into the unlocked position (referring to the arrow marked with the reference numeral 55*).

According to the preferred embodiments, this principle of the dual locking mechanism, comprising the locking mechanisms 32* and 32", can also be transferred to the preferred embodiments of FIGS. 1, 2 and 3 with the telescopic rod with the round cross-section. Here it is conceivable that a further operation push rod extends through the clamp washer 32 or 32' for the operation of the second clamp washer. This is possible, for example, with a bore hole. FIG. 2 shows such a bore hole in the clamp washer 32, with the reference numeral 58.

According to further preferred embodiments, the number of elements with telescopic bars isn't limited to two, but can be three or four, so that a further "extension" of the telescopic rod is possible. For such a case, the operation according to a locking mechanism, such as shown in FIG. 4, would be feasible. Alternatively, several parallel operation push rods could be provided for remote operation, which would extend through one clamp washer 32 (referring to bore hole 58), and which would remotely operate the additional telescopic element.

FIGS. 4A-4C and 5A-5C show another embodiment of the telescopic rod 10' in accordance with the present invention, wherein the telescopic rod 10' includes the first element 12', the second element 14' and the second locking mechanism 30*.

The first element 12' is a hollow tube extending the longitudinal axis 20, and has the slot 12s' along the longitudinal axis 20 and a flat interior wall 12i' extending along the longitudinal axis 20.

The second element 14' is slidably received in the first element 12' and movable along the longitudinal axis 20, and includes a flat restricting surface 141' to be abutted against the flat interior wall 12i'. The length of the telescopic rod 10' depends on a relative position along the longitudinal axis 20.

The second locking mechanism 30* is connected to the second element 14' to lock the position of the second element 14' relative to the first element 12', and comprises two clamp washers 32", 32* and two springs 40, 40*. The clamp washer 32" is inclined towards the first direction 56, and the second clamp washer 32* is inclined towards the second direction 56*. The two springs 40, 40* apply a normal force along the longitudinal axis 20 to the first clamp washer 32" and the second clamp washer 32*, so that the first clamp washer 32" and the second clamp washer 32* will produce a longitudinal force in the first direction 56 and the second direction 56*, respectively.

The first clamp washer 32" and the second clamp washer 32* are in a locking position angled with regard to the longitudinal axis with a first angle range, the first angle range α being smaller than 90°, but larger than 45°, and which in an unlocked position is also angled with regard to the longitudinal axis with a second angle range α1, where the second angle range α1 is smaller than the first angle range α. The first clamp washer 32" and the second clamp washer 32* each include flattened area 32ra and 32rb. When the clamp washer 32" and the second clamp washer 32* are in the locked position, the flattened area 32ra and 32rb meshes with the interior wall 12i', so that the first and second elements 12', 14' are locked to each other. When the clamp washer 32" and the second clamp washer 32* are in the unlocked position, the flattened area 32ra and 32rb are disengaged from the interior wall 12i', so that the first and second elements 12', 14' are unlocked from each other. The first clamp washer 32" and the second clamp washer 32* each include a lever 46', 46* which protrudes from the slot 12s', the levers 46' and 46* are arc-shaped and mounted in a mirrored position, and by operating the lever 46, the clamp washers 32" and 32* can be moved back and forth between the release position and the locking position.

Figure 5A:
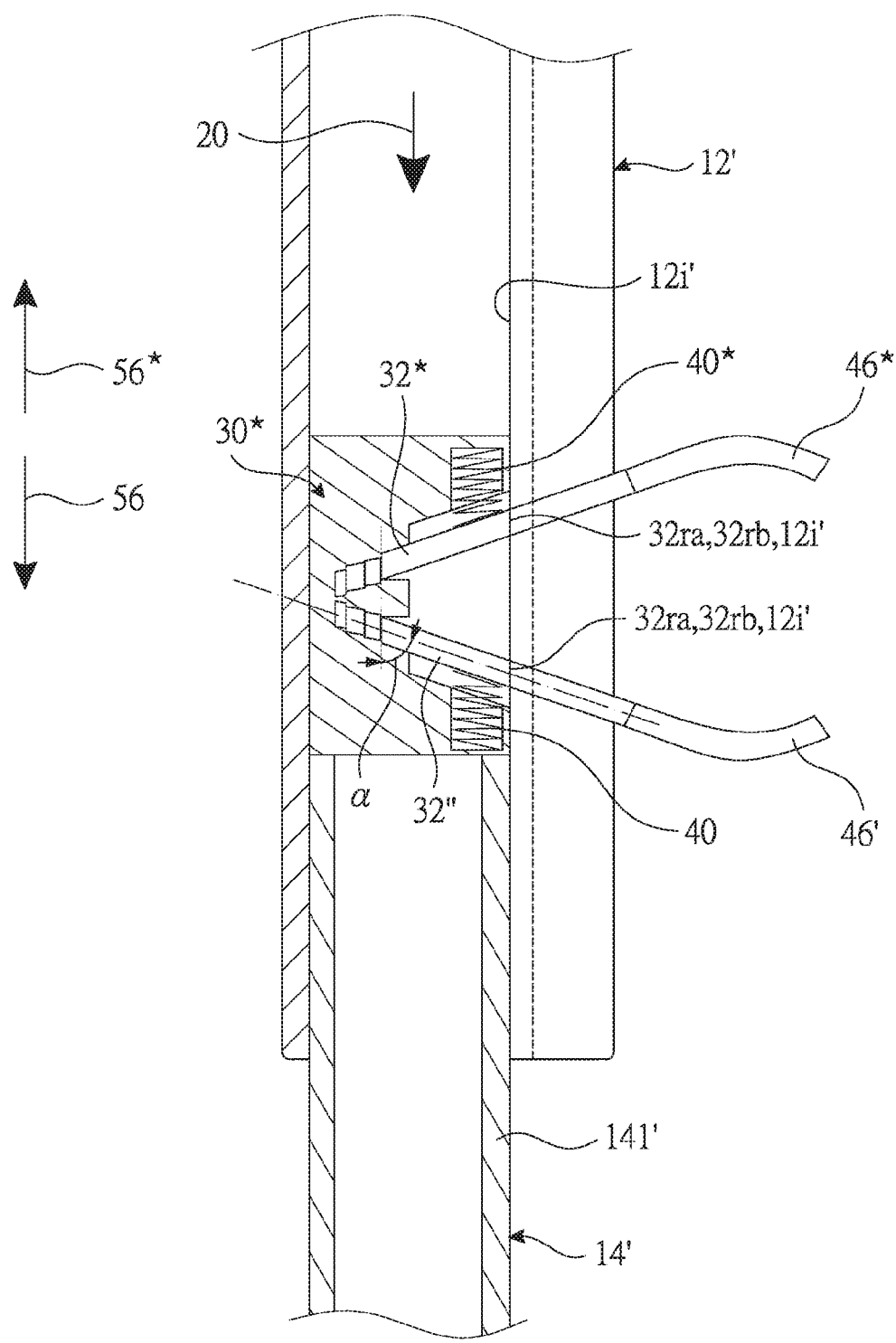
FIG. 5A-5C are schematic diagrams of the telescopic rod with the locking mechanism, which comprises the flattened clamp washer and can be operated by means of the lever.
Figure 5B:
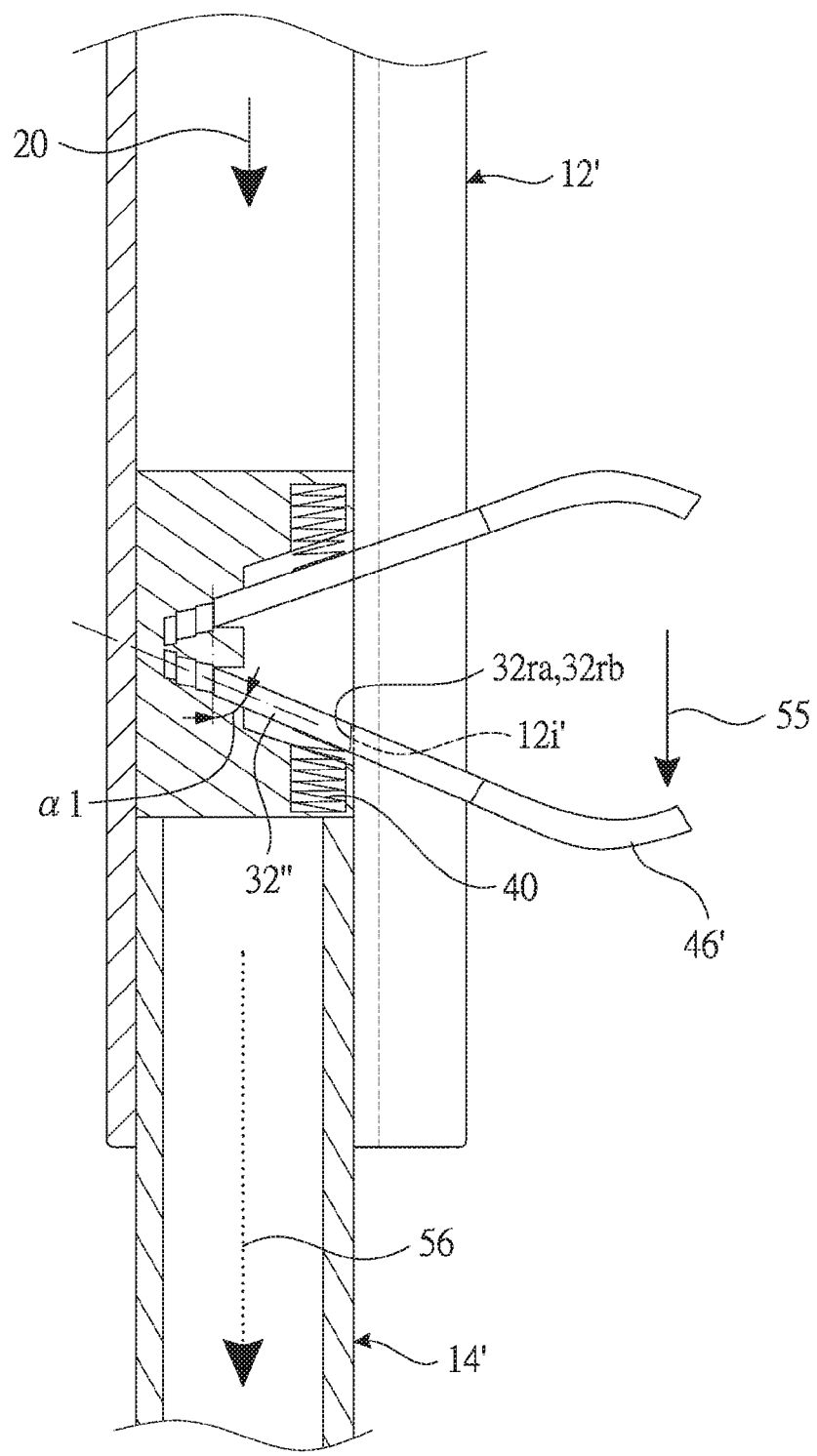
Figure 5C:
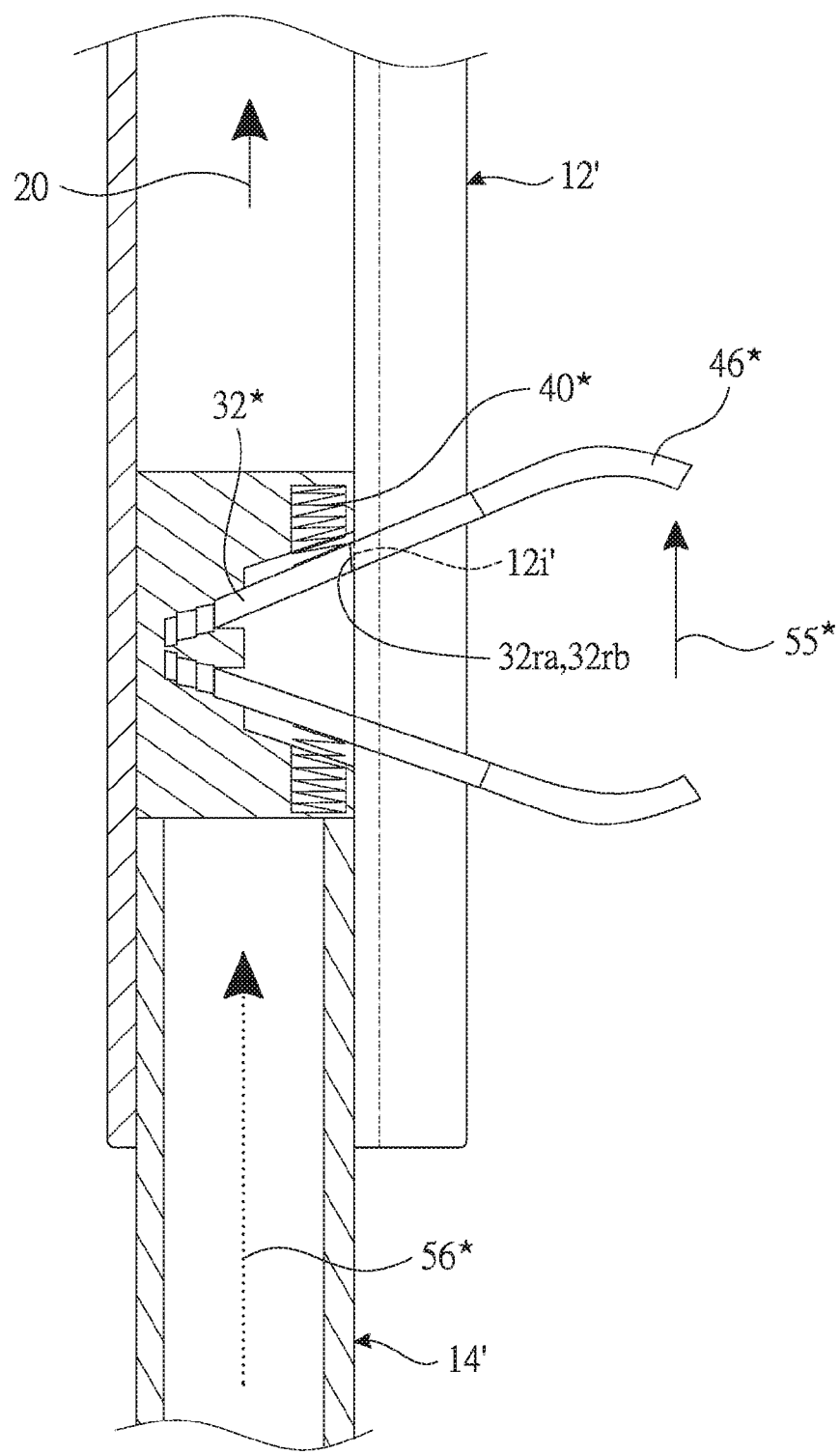

Referring then to FIGS. 5A and 5B, when the lever 46' is applied with a force to compress the spring 40 to move from the locked position to the unlocked position (the force applied along the longitudinal axis 20 is indicated by the arrow 55). At this moment, the flattened area 32ra and 32rb of the first clamp washer 32" are disengaged from the interior wall 12i' of the first element 12' (the disengagement is exaggerated for illustration purpose), which enables the second element 14' to be released from the first element 12' to facilitate retraction of the telescopic rod 10'.

It is to be noted that the first element 12' has the flat interior wall 12i' extending along the longitudinal axis 20, and the second element 14' has flat restricting surface 141' to be abutted against the flat interior wall 12i', which enables the first element 12' has a direction when assembled to the second element 14', and can prevent the first element 12' and the second element 14' from rotate relative to each other.

Furthermore, the first element 12' has the flat interior wall 12i' extending along the longitudinal axis 20, and the first clamp washer 32" and the second clamp washer 32* each include flattened area 32ra and 32rb which can mesh with the interior wall 12i', which improves the stability when first and second elements 12', 14' are locked to each other.

It should be noted here that the above preferred embodiments are not limiting, but only explain the individual functions in detail, while the individual aspects can be combined with each other arbitrarily. The scope of protection is set out by the following claims.

What is claimed is:

1. A telescopic rod, comprising:
   a first element in the form of a hollow tube extending a longitudinal axis including a slot along the longitudinal axis and a flat interior wall extending along the longitudinal axis;
   a second element slidably received in the first element and movable along the longitudinal axis, and including a flat restricting surface to be abutted against the flat interior wall, and two fixed areas in the form of a V-shaped groove, a common protrusion is located at a tapered end of the V-shaped groove, wherein the length of the telescopic rod depends on a relative position along the longitudinal axis;
   a locking mechanism connected to the second element to lock a position of the second element relative to the first element;
   wherein the locking mechanism comprises a first and a second clamp washer and two springs, the first and a second clamp washer are inclined at a locked position and at an unlocked position in a first direction that runs parallel to the longitudinal axis, the locking mechanism is formed to absorb a longitudinal force along a second direction, the first and the second directions run counter to each other, the first clamp washer is inclined towards the first direction, the second clamp washer is inclined towards the second direction, so that the locking mechanism is formed to generate a longitudinal force along the first direction and along the second direction;
   the first and second clamp washer are located at the locked position with regard to the longitudinal axis with a first angle range, wherein an angle in the first angle range is between 45° and 90°, and the first and the second clamp washers are located in the unlocked position with regard to the longitudinal axis with a second angle range, wherein an angle in the second angle range is smaller than that in the first angle range;
   the first and second clamp washers are mounted in a mirrored position in the V-shaped groove, the common protrusion forms a rotation axes for the first and second clamp washers, each of the first and second clamp washers includes a flattened area, when each of the first and second clamp washers is in the locked position, the flattened area meshes with the interior wall, so that the first and second elements are locked to each other, when the first clamp washer and the second clamp washer are in the unlocked position, the flattened area is disengaged from the interior wall, so that the first and second elements are unlocked from each other, each of the first and second clamp washers includes a lever which protrudes from the slot, the levers are arc-shaped and mounted in a mirrored position, operating the levers can move the first and second clamp washers back and forth between the unlocked position and the locked position.

2. The telescopic rod as claimed in claim 1, wherein the locking mechanism is formed to exert a normal force along the longitudinal axis between the flattened area and the interior wall.

\* \* \* \* \*